No. 799,096. PATENTED SEPT. 12, 1905.
A. W. SMITH.
WASHING MACHINE.
APPLICATION FILED JAN. 19, 1904.
2 SHEETS—SHEET 1.
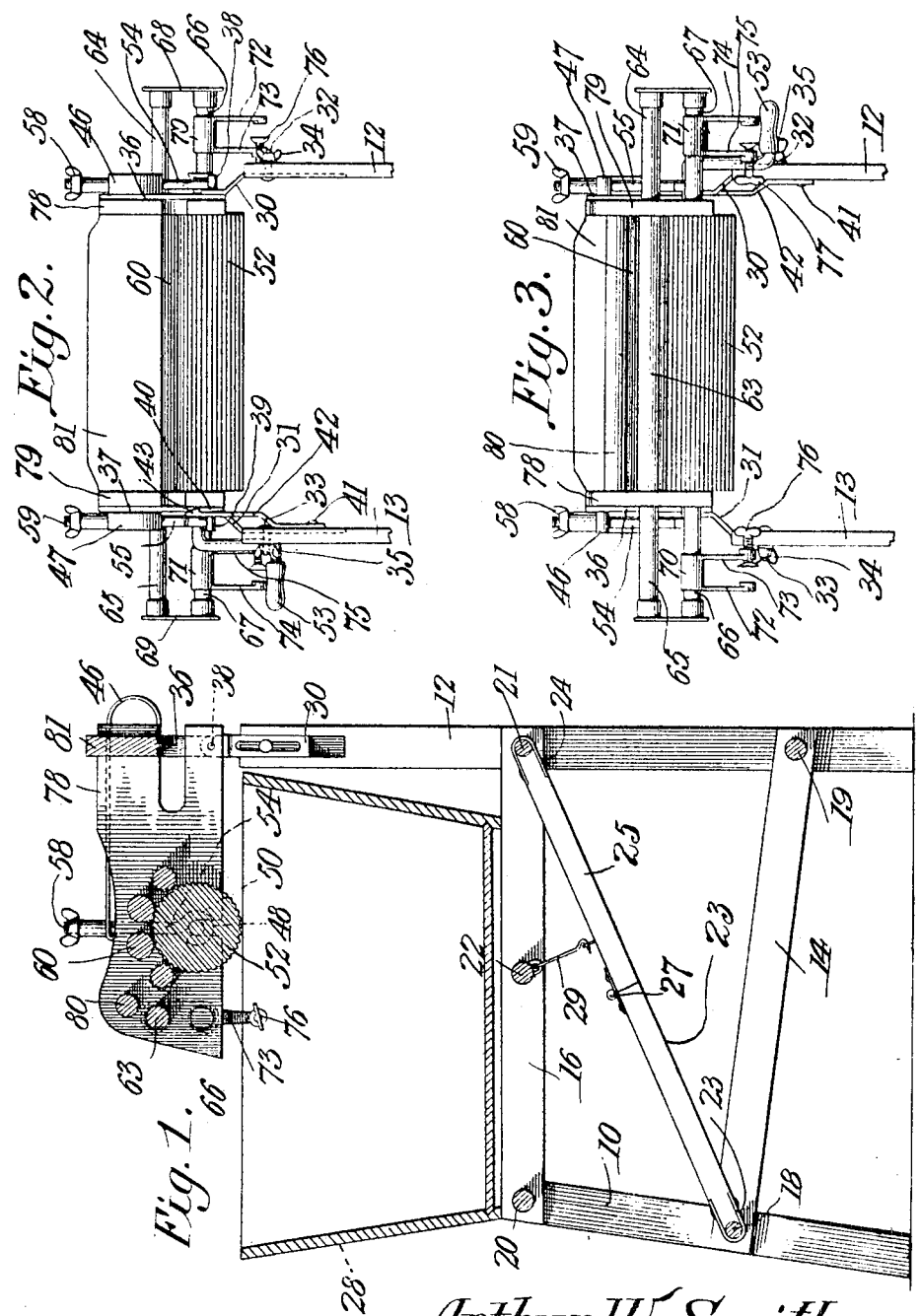

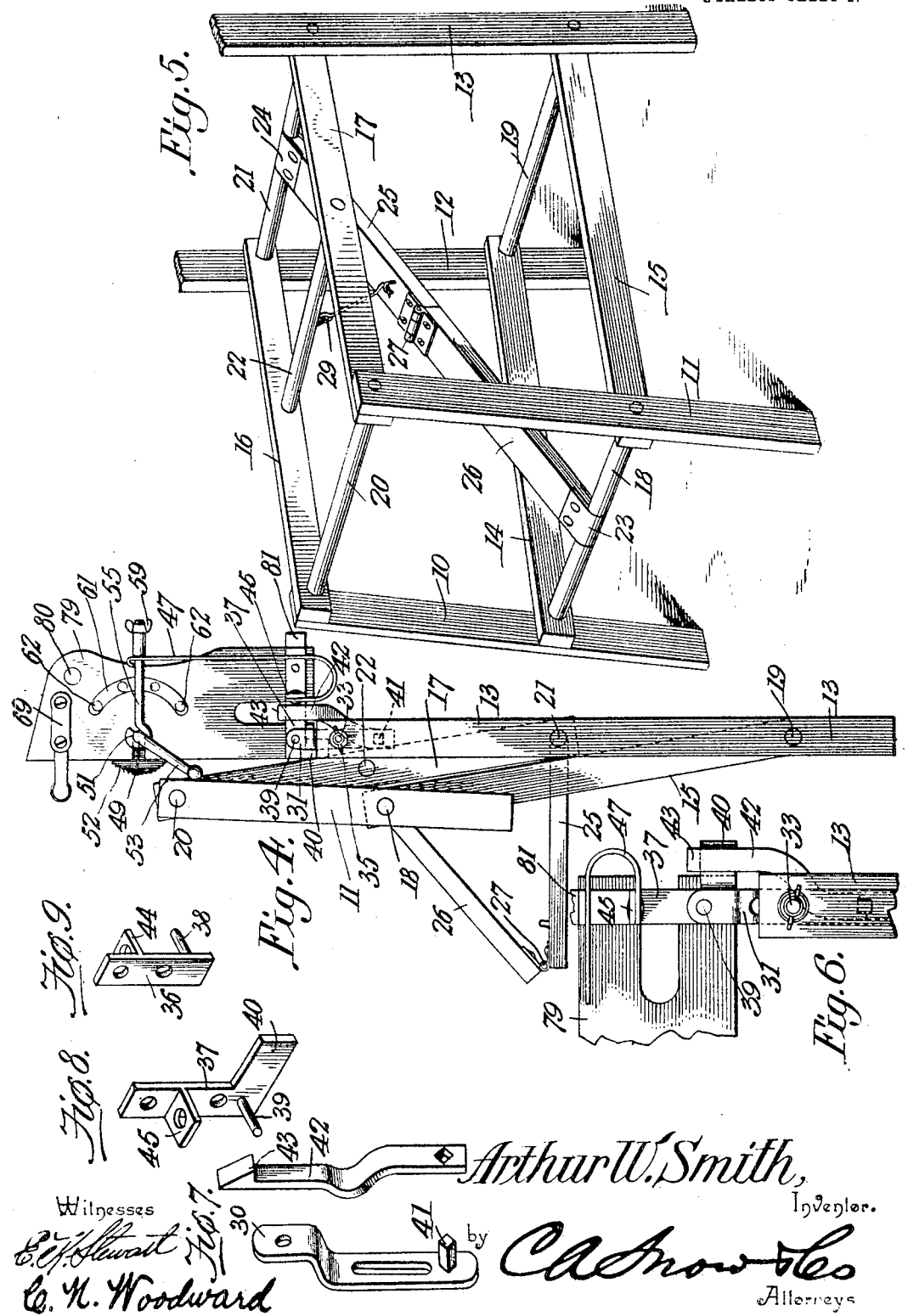

UNITED STATES PATENT OFFICE.

ARTHUR WILLIAM SMITH, OF BEMIDJI, MINNESOTA.

WASHING-MACHINE.

No. 799,096.         Specification of Letters Patent.         Patented Sept. 12, 1905.

Application filed January 19, 1904. Serial No. 189,716.

*To all whom it may concern:*

Be it known that I, ARTHUR WILLIAM SMITH, a citizen of the United States, residing at Bemidji, in the county of Beltrami and State of Minnesota, have invented a new and useful Washing-Machine, of which the following is a specification.

This invention relates to machines for washing clothes, and has for its object to produce a device of this character connected to a foldable tub-supporting frame which may be disassociated from the tub when required and foldable for transportation or storage and which may likewise be adjusted to tubs of various sizes; and the invention consists in certain novel features of construction, as hereinafter shown and described, and specified in the claims.

In the drawings illustrative of the invention, in which corresponding parts are denoted by like designating characters, Figure 1 is a longitudinal sectional elevation. Fig. 2 is a rear elevation, and Fig. 3 is a front elevation, of the washing appliances. Fig. 4 is a side elevation with the parts folded. Fig. 5 is a perspective view of the folding tub-supporting and washing-appliance-supporting frame. Fig. 6 is a fragmentary side elevation showing the relation of one of the brackets and the spring-catch for supporting the washing appliance in its operative and inoperative positions. Fig. 7 represents perspective views of one of the frame-brackets and the resilient catch member detached. Figs. 8 and 9 are perspective views of the washing-appliance brackets detached.

The improved apparatus comprises a supporting-frame for the wash-tub or other clothes-receptacle, consisting of spaced vertical front members 10 11, spaced vertical rear members 12 13, the latter extended upwardly, as shown, spaced lower horizontal side member 14 15 and spaced upper horizontal side members 16 and 17, the lower portions of the vertical members being connected to the lower horizontal members by transverse "rounds" 18 19, while the upper ends of the forward vertical members and the forward ends of the upper horizontal members are likewise connected by a similar transverse round 20, and the rear ends of the upper horizontal members are connected by a similar horizontal round 21 to the vertical rear members intermediately of their lengths, as shown. The upper horizontal members are further connected centrally by a transverse round 22. Connected, as by straps 23 24, to the diagonally opposite rounds 18 21 is a brace member formed in two parts 25 26, connected at their adjacent ends by a hinge 27, as shown. By this simple arrangement the frame is foldable, as shown in Fig. 1, for transportation or storage and may be extended for the support of the wash-tub (indicated at 28) and firmly braced and supported in its distended position, as in Fig. 1, by the jointed brace member. To obviate any danger of accidental displacement of the parts, a detachable hook 29 will be arranged between the central round 22 and the brace member 25, as shown. The upper extended ends of the rear vertical members 12 13 are provided with longitudinal recesses in which slotted brackets 30 31 are secured by bolts 32 33, having wing-nuts 34 35 exteriorly of the members 12 13, as represented, by which means the brackets may be adjusted longitudinally of the vertical members.

The brackets 30 31 are formed "rights" and "lefts" and each with an offset near their free upper ends and are designed to afford means for movably supporting the washing appliances, whose construction will now be described.

The main frame of the washing appliances comprises two side plates 78 79, spaced apart and united at the forward end by a round or bar 80 and at the rear by a relatively wide plate 81, the latter forming a means for the support of the wringer. Attached to the rear ends of the side members 78 79 are brackets 36 37, having studs 38 39 at their lower ends for rotative engagement with the offset ends of the brackets 30 31, by which means the frame is mounted to swing upon the vertical members 12 13, as will be obvious.

One of the brackets 36 37—for illustration, the bracket 37—is provided with a lateral arm 40, and one of the brackets 30 31—for illustration, the bracket 31—is provided with a projecting stud 41, preferably square or in other shape than round, the latter designed to support a resilient clamp or arm 42, having an offset 43 for detachable engagement with the arm 40, as represented, to provide a detachable coupling means between the washer-appliance frame and the supporting means, as hereinafter described. Extending from the brackets 36 37 are lugs 44 45, to which springs 46 47 are riveted or otherwise secured, the springs curving forwardly and extending to points opposite the journals of the rubbing drums or rollers. Formed in the lower edges of side plates 78 79 are transverse slots 48 49, in which journals or bearings 50 51 on a fluted rubbing roller or drum 52 are freely movable, the journal 51 extended into an operating-crank 53, as shown. The free ends of the springs 46 47 are connected to the journals or bearings 50 51, respectively, by rods 54 55, the latter having hooks at their lower ends for movable engagement with the roller-journals and threaded at the upper ends and supplied with wing-nuts 58 59, as shown. By this simple arrangement it will be obvious the roller 52 is supported yieldably in position and is rendered rotative by the crank 53 and is adjustable vertically by the wing-nuts 58 59.

Mounted for rotation between the side members 78 79 above the fluted roller 52 and concentric thereto are a plurality of smaller rollers 60, the outer ones preferably fluted and the intermediate ones not fluted, as shown. Any number of the smaller rollers may be employed; but generally four will be used, as shown. Attached to the outer surfaces of the side members 78 79 are curved metal plates 61, having spaced apertures for the journals or bearings 62 of the rollers 60, so that the wooden members 78 79 will not be worn by the rotation of the journals, as will be obvious.

It will be noted that the smaller rubbing-rollers are disposed above the larger fluted roller, and this relative disposition of the rollers is an important feature of the invention, as hereinafter explained.

Connecting the side members 78 79 at their forward ends is a round or bar 63, having its ends extended beyond the side members, as at 64 65, while spaced from these extended ends are bars 66 67, connected by their inner ends to the members 78 79. The outer or free ends of the portions 64 65 of the bar 63 and the spaced members 66 67 are connected by brackets 68 69, the latter formed of ferrules inclosing the ends of the members coupled by integral plates, as shown, the ferrules connected in place by screws or other suitable fastenings. Mounted for rotation upon the members 66 67 are sleeves 70 71, having spaced arms 72 73 and 74 75 depending therefrom, the arms 73 75 having clamp-screws 76 77 operating therethrough, as shown. The sleeves 70 71 and their attachments form clamping means to engage the upper edge of the tub 28, as indicated, and by being movable longitudinally of the members 66 67 are adapted to tubs of varying diameters, while by arranging the frame supporting the rubbing-rollers to swing vertically by one end the device may be readily adapted to tubs of varying heights, as will be obvious.

When attached to the tub by the clamp members, the spring-catch 42 will not necessarily be in operation; but when it is desired to remove the tub the clamp-screws 76 77 are disconnected and the members 78 79 and their attachments elevated until the arm 40 engages the offset 43 of the catch 42, when the washing appliances will be held suspended free from the tub. Thus the washing appliances may be disposed entirely independent of the tub when required, which is of very material advantage during the washing process and enabling the tub to be removed and spaced in position when required, or one tub substituted for another. By this arrangement also the washing appliances are foldable with the supporting-frame, as shown in Fig. 4, when not in use or when the device is to be transported.

By this arrangement of parts the garments to be washed are carried over the larger fluted roller 52 and rubbed with considerable force against the smaller rotating rollers 60, thus efficiently removing the adhering dirt and discharging them in a cleansed condition or feeding them to the wringer attached to the plate 81.

In the process of rubbing the garments between the fluted and smooth rollers the garments will not wrap around the rollers as they would have a tendency to do if the smaller rollers were beneath the larger roller. When leaving the larger roller the force of gravity will cause the garments to drop away from the last smaller roller and will therefore be prevented from wrapping around it, as will be obvious. This is a very important feature of the invention and materially increases efficiency and utility of the invention.

The metal parts of the device will preferably be galvanized or otherwise protected from the action of air or water and may be of any required size or strength. The wooden portions may likewise be of any required size or strength, and the parts may be modified in minor particulars without departing from the principle of the invention or sacrificing any of its advantages.

Having thus described the invention, what I claim is—

1. A washing-machine comprising a frame including spaced side members and a wringer-board terminally connecting the side members, tub-clamps carried by the other ends of the side members, rubbing-rollers journaled between the side members, and supporting-brackets carried by the side members adjacent to the wringer-board.

2. A washing-machine comprising spaced frame members, attaching-brackets carried by the rear ends of the members, rubbing-rollers journaled between the frame members, a cross-bar piercing the front ends of the members and projected externally thereof, bars carried by and projected externally of the members in alinement beneath the projected ends of the cross-bar, braces connecting the outer ends of the bars, and tub-clamps hung from the lower bars.

3. A washing-machine comprising spaced frame members, attaching-brackets at the rear ends of the members, rubbing-rollers journaled between the members, bars carried by the front ends of the members and projected externally thereof, and tub-clamps carried by the bars, each clamp having a sleeve embracing the adjacent bar with spaced arms pendent from the sleeve and a set-screw piercing one of the arms.

4. A washing-machine comprising spaced frame members having transverse slots, supporting-brackets carried by the rear ends of the members, a rubbing-roller having its journals mounted to slide in the slots of the frame members, a series of rubbing-rollers journaled in the frame members in coöperative relation with the first-mentioned roller, bowed springs connected to the brackets and extending forwardly upon the exterior of the frame above the rubbing-roller with their free ends overlapping the journals of the first-mentioned roller, links engaging with the journals and loosely piercing the free ends of the respective springs, and adjusting-nuts carried by the outer ends of the links to vary the tension of the springs.

5. A washing-machine comprising spaced frame members, rubbing-rollers journaled between the frame members, brackets carried by the frame members, one of the brackets having a lateral projection, other brackets formed for connection with a support and having hinged connections with the first-mentioned brackets, and a spring-catch carried by one of the supporting-brackets and disposed to engage the projection upon one of said brackets to support the frame in the operative position of the washing-machine.

6. A washing-machine comprising a frame, rubbing-rollers carried by the frame, brackets mounted upon the frame, one of the brackets being angular in shape with one arm projected in rear of the frame, supporting-brackets hinged to the first-mentioned brackets and formed for engagement with a support, and a spring-catch carried by one of the supporting-brackets and disposed to engage one arm of the angular bracket to support the frame in the operative position of the machine and to engage the other arm of the angular bracket and hold the machine in its inoperative position.

In testimony that I claim the foregoing as my own I have hereto affixed my signature in the presence of two witnesses.

ARTHUR WILLIAM SMITH.

Witnesses:
W. L. BROOKS,
C. N. WOODWARD.